UNITED STATES PATENT OFFICE.

JOHN E. HUTCHINSON, OF ASPINWALL, PENNSYLVANIA, ASSIGNOR TO JAMES F. HENDERSON, OF PITTSBURGH, PENNSYLVANIA.

MATERIAL FOR PURIFYING GAS.

1,370,494.     Specification of Letters Patent.     Patented Mar. 1, 1921.

No Drawing.     Application filed December 8, 1919. Serial No. 343,311.

*To all whom it may concern:*

Be it known that I, JOHN E. HUTCHINSON, residing at Aspinwall, in the county of Allegheny and State of Pennsylvania, a citizen of the United States, have invented or discovered certain new and useful Improvements in Materials for Purifying Gas, of which improvements the following is a specification.

It is desirable in many commercial operations to remove from a mixture or combination of fluids, one or more of the elements or constituents of such mixture or combination and the most common method for effecting such elimination of the undesirable constituent is to pass the fluid through a mass of material having an affinity for such constituent.

For efficient operation the following condition must be satisfied: A large surface or area of contact must be provided and the mass or bed of material should be permeable by the gas being treated but not so open that the gas can pass through so rapidly that only a partial elimination of the undesirable constituent can be effected. A large surface or area of contact can be obtained by employing the material in a finely divided condition, but when in such a state a mass of the material will be so dense or compact that considerable pressure will be necessary to force the gas through the mass. In order to overcome this density, it has been the practice to mingle with the finely divided material, substances of such size and shape as to render the whole mass sufficiently loose or open that gas may readily permeate and pass therethrough. As for example, compounds of sulfur are removed from coal gas by passing the gas through a bed consisting of iron filings, chips or borings, hydrated iron ore or other material having an affinity for sulfur compounds and a fluffing material as wood shavings, chips, sawdust, etc. As the finely divided material having an affinity for sulfur compounds and the fluffing material are moist, the finely divided material will adhere to and form a coating over the surfaces of the fluffing material and it is with these coatings that the gas contacts. As the gas passes through the scrubbers before entering the desulfurizing beds, its condition as regards moisture and temperature will vary and these conditions will affect the desulfurizing beds injuriously. If the gas carries with it considerable moisture, the mass will become soggy or gelatinous and the flow of gas therethrough is retarded. If the gas is relatively dry and hot the moisture in the mass will be vaporized and carried off, thus so drying out the finely divided material that it will drop from the surfaces of the fluffing material to the bottom of the box and form a compact layer practically impervious to the gas, except under relatively high pressure.

After the purifying beds formed in the manner above stated, have been used for sometime, they become so impregnated with the sulfur compound as to be ineffective and the material is then removed from the boxes and spread out in a layer or layers four or five inches thick so that the oxygen of the air may combine with the iron compound leaving iron oxid and free sulfur in the mass, and it occurs not infrequently that the heat generated in thus revivifying will become so great as to cause spontaneous combustion, thus destroying the efficiency of the purifying material.

The invention described herein has for its object the provision of a fluid segregating material consisting of finely divided material having an affinity for the particular fluid which it is desired to segregate from a mixture or combination of two or more fluids, and a material for binding the finely divided materials into solid but porous lumps or masses, the binding material being of such a character that the bond between the particles will not be destroyed or weakened by the action of the fluids to be treated or the condition of such fluid, *e. g.*, its temperature or the moisture carried thereby. The invention is hereinafter more fully described and claimed.

In the practice of the invention a suitable quantity of material having an affinity for the ingredient to be segregated from a mixture or combination of fluids in a finely divided condition is mixed with a binding material as cement, lime, plaster of Paris or a combination of two or more of these materials and water and in such proportions and under such conditions that the resultant product will be a solid but porous body, the external surfaces and the surfaces of the pores or minute passages in such body being formed in part, at least, by the fine particles of the material having an affinity for the fluid ingredient which is to be segregated.

When it is desired to utilize the improvement described herein for removing the sulfur compounds from coal gas, hydrated oxid of iron is mixed with water and cement in such proportions that when the cement has set and hardened, the resulting product will be a solid but porous body. In order to increase the porosity, especially when the hydrated oxid of iron is finely divided, it is preferred to incorporate with the hydrated oxid of iron and cement, coke breeze, sand finely divided, limestone, slag or other suitable material which will act to so space the particles of oxid that gases may penetrate and pass through the body with comparative freedom.

It will be understood that in preparing the improved purifying material only sufficient cement and spacing material as coke breeze, sand, etc. are used to produce their functions. As before stated, the binding material should be of such a character that its adhesive quality will not be affected by the gas or the physical condition, e. g., temperature and moisture and the percentage of binding material employed is preferably only sufficient to prevent disintegration of the lumps when being charged into the treating boxes or by reason of the pressure to which underlying portions of the bed are subjected, as for example, a mixture of four parts of the material having an affinity for the constituent to be segregated, e. g., oxid of iron, three parts of the spacing material, e. g., coke breeze, sand, etc. one part of the binder, e. g. cement, lime, plaster of Paris or a mixture of two or more of these binders and sufficient water to form an easily worked mortar, have given satisfactory results. When the mixture has set or hardened it is broken up into small lumps or pieces preferably not greater than an inch in their greatest dimension.

It will be readily understood that the smaller the lumps or pieces, the greater will be the area of contact for the gases, but the lumps should not be so small that there will be any material resistance to the flow of gas through the mass at normal pressure. As the small lumps or pieces are porous, the gas will pass not only around the lumps contacting with the segregating particles forming portions of the outer surfaces of the lumps, but will also contact with the inner particles of such material forming portions of the walls of the pores or minute passages in the lumps.

While the fine particles of silica, limestone, or other dense material, mingled with the oxid of iron or other segregating material employed, will space the particles of the latter rendering the lumps porous as above described, it is preferred to employ as a spacer some material which is itself porous, as for example, coke breeze, so that there will be a larger quantity of gas passing through the lumps.

It is characteristic of the improved material that it will not be so effected by either heat or moisture as to disintegrate and it may be revived by cutting out the flow of gas through the mass and permitting air to flow therethrough, or passing a mixture of gas (preferably purified) and air through the bed of material.

I claim herein as my invention:

1. A material for segregating an undesirable constituent of a mixture or combination of fluids consisting of a lump or body having pores therein and having a material having an affinity for the undesirable constituent so incorporated throughout its mass that such material will form a part at least of the external surface and the surfaces of the pores of said lump or body and be exposed to the fluid passing around the lump and entering the pores thereof.

2. A material for segregating an undesirable constituent of a mixture or combination of fluids consisting of a body or lump having pores therein and formed of a mixture of a plurality of materials one of which will serve as a binder and one having an affinity for the undesirable constituent and having the material having an affinity for the undesirable constituent so distributed throughout the lump or body that the external surface of the lump or body and the surfaces of the pores therein will be formed in part at least of the material having an affinity for the undesirable constituent.

3. A material for segregating sulfur compounds from gas consisting of a lump or body having pores therein and having incorporated therein and so distributed throughout its mass a material having an affinity for sulfur compounds that such material will be an integral part of the mass and will form a part at least of the external and internal surfaces of the lump or body.

4. A material for segregating sulfur compounds from gas consisting of a lump or body having pores therein and having hydrated oxid of iron incorporated therein and so distributed throughout its mass that the external and internal surfaces will be formed in part at least of such hydrated oxid of iron.

5. A material for segregating an undesirable constituent of a mixture or combination of fluids consisting of a body or lump having pores therein and formed of a mixture of materials one of which will serve as a binder, one having an affinity for the undesirable constituent of the fluids and an inert material adapted to serve as a spacer, such materials forming when set or hardened a body or lump having pores or minute passages therein and having the material possessing an affinity for the undesirable constituent so distributed throughout its mass that the external surfaces and the surfaces of the pores or passages in the lump or body will be formed in part at least of the material having an affinity for the fluid constituent to be segregated.

6. A material for segregating the sulfur compound from a mixture or combination of gases consisting of a body having pores therein and formed of a mixture of coke breeze, hydrated oxid of iron and cement, the hydrated oxid of iron being so distributed throughout the body or lump that the external and internal surfaces of the lump will be formed in part at least of such hydrated oxid of iron.

7. A material for segregating a sulfur compound from coal gases consisting of bodies or lumps each lump or body having pores therein and formed of a mixture of coke breeze, hydrated oxid of iron and a binding material, the hydrated oxid of iron being so distributed throughout the lump or body that the external and internal surfaces will be formed in part at least of such hydrated oxid of iron.

In testimony whereof I have hereunto set my hand.

JOHN E. HUTCHINSON.